United States Patent [19]
Bertschi et al.

[11] Patent Number: 5,789,033
[45] Date of Patent: Aug. 4, 1998

[54] INJECTION MOLDING APPARATUS HAVING OPPOSED INJECTION MEANS

[75] Inventors: Rene A. Bertschi, Wiesbaden, Germany; Edward J. Jenko, Bolton, Canada

[73] Assignee: Husky Injection Molding Systems Ltd., Canada

[21] Appl. No.: 831,509

[22] Filed: Mar. 31, 1997

Related U.S. Application Data

[62] Division of Ser. No. 712,481, Sep. 11, 1996, Pat. No. 5,651,998, which is a continuation of Ser. No. 254,139, Jun. 6, 1994, abandoned.

[51] Int. Cl.$^6$ ............................................ B29C 45/22
[52] U.S. Cl. .................. 425/572; 264/297.2; 264/328.8; 425/588
[58] Field of Search .................. 425/572, 127, 425/130, 573, 588; 264/241, 250, 255, 260, 297.2, 328.8, 328.7

[56] References Cited

U.S. PATENT DOCUMENTS

| | | |
|---|---|---|
| 3,873,656 | 3/1975 | Garner . |
| 4,212,626 | 7/1980 | Gellert . |
| 4,275,030 | 6/1981 | Mares . |
| 4,717,324 | 1/1988 | Schad et al. . |
| 4,803,031 | 2/1989 | Ochs et al. . |
| 5,028,226 | 7/1991 | De'ath et al. . |
| 5,145,630 | 9/1992 | Schad . |

*Primary Examiner*—Tim Heitbrink
*Attorney, Agent, or Firm*—Bachman & LaPointe, P.C.

[57] ABSTRACT

The foregoing objects are attained by the inventive opposed gating injection method and apparatus of the instant invention for forming molded articles and for use with injection molders wherein a first mold half and a second mold half are adapted to cooperate and form at least one mold cavity. The invention includes a first injector nozzle positioned in a first mold half adjacent the cavity, for injecting a first molding resin into the cavity through a first orifice. A second injector nozzle is included which is positioned in the second mold half adjacent the cavity for injecting a second molding resin. The second resin may be different from the first resin or the same as the first resin. The second resin is injected through a second orifice unconnected with the first orifice. In accordance with the invention, the injector nozzles may be either simultaneously or sequentially activated for filling the mold cavity, and may be single material or co-injection type nozzles.

7 Claims, 5 Drawing Sheets

INJECTION MOLDING APPARATUS HAVING OPPOSED INJECTION MEANS

This is a Division of application Ser. No. 08/712,481 filed Sep. 11, 1996 now U.S. Pat. No. 5,651,928 which in turn is a Continuation of U.S. Ser. No. 08/254,139, Jun. 6, 1994 now abandoned.

BACKGROUND OF THE INVENTION

This invention relates to injection molding, and more particularly, to an improved apparatus and method for facilitating space efficient injection molding using opposed nozzles.

The method of co-injection is characterized by injecting a first resin into a mold cavity, followed by, or simultaneously with, the injection with one or more other resin types into the same cavity. This method typically results in the article having multiple layers across its cross-section and generally a greater number of layers than resin types in the case where sequential injection of the resins is used.

The injection art includes a multitude of apparatuses and processes for forming molded articles from multiple resins by co-injection. For example, U.S. Pat. Nos. 5,028,226 and 4,717,324, show simultaneous and sequential co-injection apparatuses and methods, respectively. Both patents show one nozzle dedicated to a mold cavity wherein the mold cavity is completely filled for molding purposes by injecting a multitude of resins through a single gate orifice. Because a single orifice is used for the multitude of resins, the hot runner system employed to receive the various resin types from the resin source for conveyance to the molded cavities can be very complicated, as evidenced in the figures shown in the two patents. As a result, such complicated hot runner systems lead to mold designs which are not compact and thereby allow fewer cavities and fewer articles to be molded within a given space on a molding machine. Because of their complexity, the systems also require special design and manufacturing attention not normally required or encountered with less demanding one resin injection systems.

An alternative co-injection process is shown in U.S. Pat. No. 4,803,031, where molded articles are formed by injecting one resin into a cavity and filling the cavity space, and thereafter enlarging the cavity and filling the additional space with a second resin. The result of such a technique is two distinct areas each comprised of a resin type. However, such an arrangement requires two injection points into the mold cavity, resulting in complicated and bulky hot runner designs. As can be seen in the figures, the design of the hot runners dictate wide spacing of the cavities and are in themselves of a complicated non-rectilinear design. U.S. Pat. No. 4,275,030 suffers from these same problems, disclosing a similar method of producing a molded article from multiple resins. In this patent, the mold cavities are partitioned by movable blades, and resin is injected into a first partitioned portion of the cavity. The blade is then moved and resin is injected into the remaining portion of the cavity through an additional nozzle orifice. As a result, the different resin types are caused to join or weld at the area formally occupied by the blade.

U.S. Pat. No. 3,873,656 shows a co-injection apparatus wherein a multitude of plastics are injected into a mold cavity through a number of different gates. The timing of the opening and closing of the gates dictates the amount and extent of the resin types which form the molded article. As can be seen from the figures, the design is only suitable for molding very large plastic articles, wherein the multitude of gates can be used. Also, the hot runner shown does not have the capability for allowing individual temperature control of the different resin types, which inherently limits the variety of resins which can be used in the system together. In addition, since the gates are apart from one another, the flow of each resin will not be symmetrical throughout the part but instead will be biased in the area of the injection orifice.

U.S. Pat. No. 4,212,626 discloses an apparatus and method for transferring plastic in a stack mold arrangement. Two melt injection units are used, one unit is located in the stationary platen of the stack mold and the other unit is located in the movable platen of the stack mold. Each unit has its own runner passage and its own flow control gate. When the movable platen is in the closed position, against the stationary platen, the gates of each unit are in conducting communication. Accordingly, the gate of each unit is actuated to open and close when the platen is in the closed position in order to provide a flow of pressurized melt from the first runner passage to the second runner passage. The apparatus disclosed is not designed for use with two materials. One hot runner is provided for feeding a plurality of cavities from one nozzle. The hot runner passes through separate control valves and progressively moves plastic to each cavity. With only one hot runner providing materials to all cavities, only one material can be used to mold the articles.

U.S. Pat. No. 5,145,630 discloses a method and apparatus for improved core/cavity alignment in the production of a monomaterial thin walled container. This apparatus is used to inject plastic into the rim portion of a thick lipped article for stabilizing the position of the mold core with respect to the cavity during the process of plastic injection. In the embodiment shown in FIG. 4, simultaneous injection of plastic from opposite ends of the container is shown. The purpose of the simultaneous injection is apparently to stabilize the core shift by reducing plastic flow length through the thin wall section. As a result, more uniform flow is established. The apparatus disclosed is directed only for use with a single resin.

Hence, there exists a need in the injection molding art for a simplified mold design which allows for efficient positioning of nozzles and efficient space use, for the injection of a plurality of resins.

SUMMARY OF THE INVENTION

The primary object of this invention is to provide a system and method for injecting multiple resins into a mold cavity in a space efficient manner.

Another object of this invention is to provide an injection system and method which uses simple nozzle and hot runner designs.

Yet another object of this invention is to provide an injection system and method wherein hot runners and nozzles can be independently adjusted for each resin, while being space efficient for placement in the mold.

Still another object of this invention is to provide an injection system and method which is simple in construction and can produce parts with unique qualities.

And still another object of this invention is to provide a space efficient single material injection system for efficiently molding a plurality of articles in a multi-cavity mold.

The foregoing objects are attained by the inventive opposed gating injection method and apparatus of the instant invention which is used in the main embodiment, for forming molded articles from a composite of materials with injection molders having a first mold half and a second mold half adapted to cooperate to form at least one mold cavity. The invention includes a first injection means positioned in the first mold half adjacent the one cavity for injecting a first molding resin into the mold cavity through a first orifice. A second injection means is included which is positioned in the second mold half adjacent the mold cavity for injecting a second molding resin. The second molding resin may be different from or the same as the first resin. The second resin is injected through a second orifice unconnected with the first orifice. In accordance with the invention, the injection means may be either simultaneously or sequentially activated for filling the mold cavity.

Another embodiment of the invention includes a first injection means for injecting a first material in a first mold cavity. The first injection means is positioned in the first mold half. A second injection means is included for injecting the first material in a second mold cavity unrelated to the first mold cavity. The second injection means is positioned in the second mold half, wherein the first and second injection means are relatively positioned in an offset manner.

An injection process for the main embodiment includes forming a molded article from a composite of materials which includes the step of providing an injection molder having first and second mold halves adapted to cooperate to form at least one mold cavity for forming the molded article. Additional steps of the process include injecting a first material into the mold cavity from a position within the first mold half and injecting a second material into the mold cavity from a position within the second mold half, wherein the second material is different from the first. The process may include the steps of injecting either being sequential or simultaneous, wherein the selected style dictates the type of layered arrangement comprising the final molded article.

The first embodiment of the invention may include the first injection means being a first injection nozzle positioned in an opening within the first mold half of the injection molder. The same embodiment may include the second injection means being a second injection nozzle positioned in an opening within the second mold half, wherein the materials from the first and second nozzles are distributed in the cavity formed by the mold halves. The same embodiment may also include each injection nozzle having a separate material source wherein the sources for each nozzle are unconnected. Alternative embodiments of the invention may also include the nozzles substantially opposing each other or in an offset arrangement.

The details of the present invention are set out in the following description and drawings wherein like reference characters depict like elements.

DETAILED DESCRIPTION OF THE PREFERRED EMBODIMENT

Figure 1:
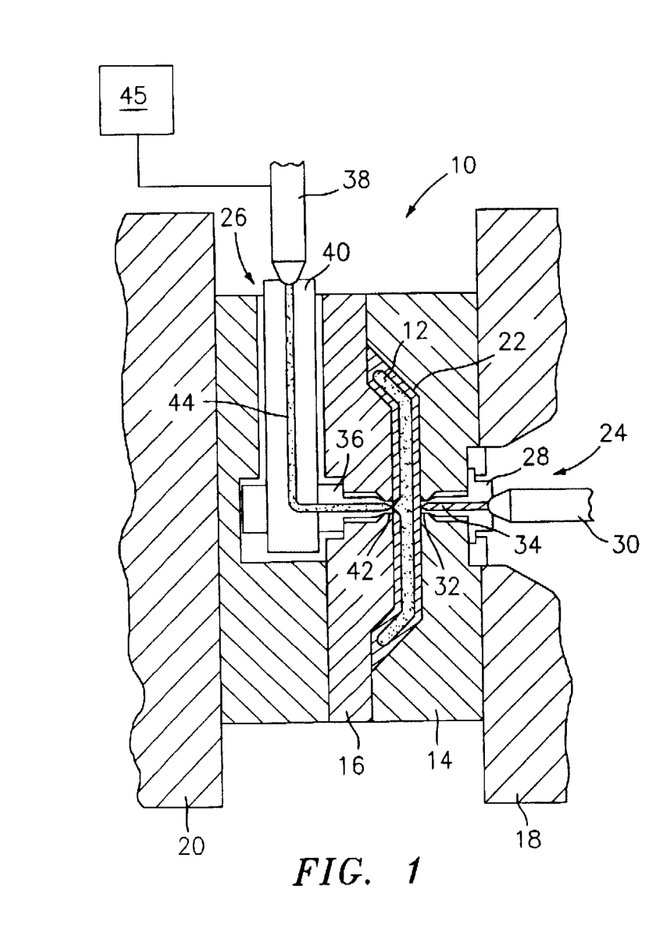
FIG. 1 is a cross-sectional elevational view of an injection apparatus in accordance with the principles of the present invention.

Referring now to the drawing in detail, there is shown in FIG. 1 a cross-sectional elevation view of the opposed gating injection molding device of the present invention, designated generally as 10. Device 10 is used to form an article 12 between a female mold half 14 having a molding surface and a male mold half 16, having a molding surface, wherein female mold half 14 is connected with a stationary platen 18 and male mold half 16 is connected with a moving platen 20. Female mold half 14 cooperates with male mold half 16 to form a mold cavity 22.

As shown in FIG. 1, device 10 includes an injection assembly 24 positioned in female mold half 14 and stationary platen 18 and an injection assembly 26 positioned in male mold half 16. Injection assembly 24 includes nozzle 28 and injection unit 30. Nozzle 28 is positioned in female mold half 14 adjacent mold cavity 22 such that orifice 32 opens into cavity 22. Injection unit 30 is in flow communication with a source (not shown) for resin or material 34 which is forcibly injected into cavity 22 via nozzle 28 and injection unit 30. Similarly, injection assembly 26 includes nozzle 36, injection unit 38, and in addition, a melt flow manifold 40. In this embodiment, nozzle 36 is positioned in male mold half 16 essentially opposite the positioning of nozzle 28 in female mold half 14, adjacent mold cavity 22. Accordingly, nozzle orifice 42 opens into mold cavity 22 for depositing another resin or material 44 therein during the injecting molding process.

As shown in FIG. 1, assembly 26 is positioned in a different manner than assembly 24. That is, injection assembly 24 in female mold half 14 is arranged such that injection unit 30 is positioned on the same horizontal plane as nozzle 28, such that they are substantially in line. However, because assembly 26 uses a manifold 40 for heating resin 44 prior to its entrance into nozzle 36, and for horizontal space saving reasons, injection unit 38 is positioned substantially perpendicular to and spaced vertically from nozzle 36. As a result, vertical space is used in supporting elements of the device as opposed to having to increase the horizontal dimensions of the molder.

Figure 2:
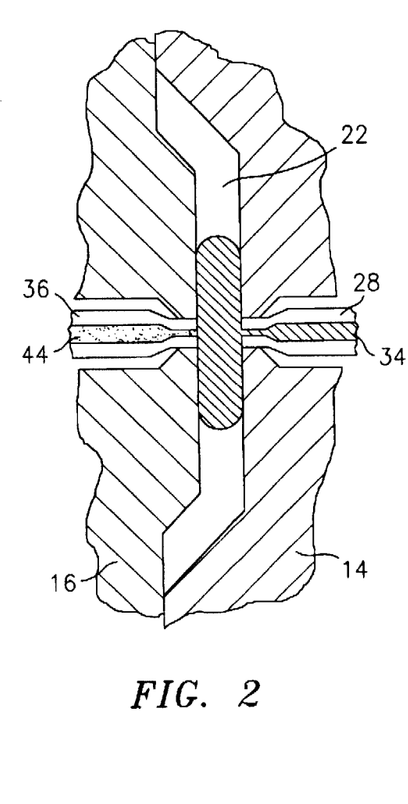
FIG. 2 is an enlarged view of FIG. 1, showing the first injection step of a sequential injection process.
Figure 3:
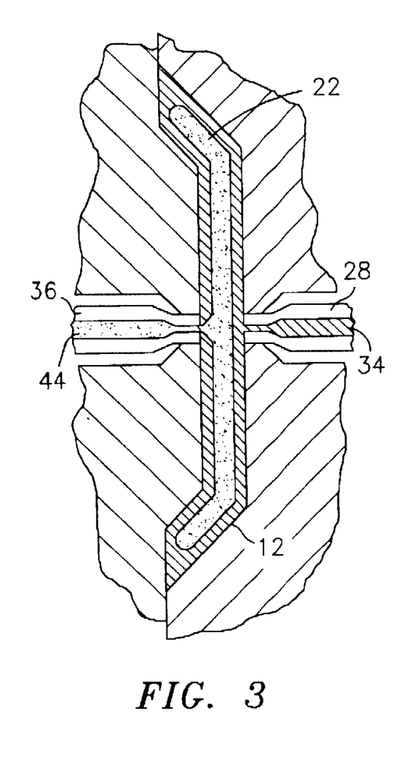
FIG. 3 is similar to FIG. 2, showing the second injection step of the sequential injection process.

Referring now to FIG. 2, a molded article can be formed from a combination of different resins, 34 and 44, wherein each resin is separately introduced into cavity 22 from opposing nozzles 28 and 36. As shown in FIG. 2, first resin 34 is first introduced into cavity 22 through nozzle 28 and partially fills the central portion of cavity 22. Subsequently, second resin 44 is introduced into cavity 22 through nozzle 36 wherein the mold cavity 22 becomes filled with resins 34 and 44 in the manner as shown in FIG. 3. As a result of this sequential injection process, firstly introduced resin 34 is forced to the edges of mold cavity 22 via resin 44. An article 12, as shown in cavity 22 of FIG. 3, is formed wherein resin 34 forms the exterior of article 12 and resin 44 forms the interior of article 12.

By the arrangement shown in FIGS. 1–3, the simplified injection assemblies shown can each have independent and precise temperature controls particularly compatable with each resin, thereby simplifying hot runner construction. Additional controls 45, shown schematically in FIG. 1, for selecting simultaneous or sequential injections from the nozzles are also implemented with device 10.

Figure 4:
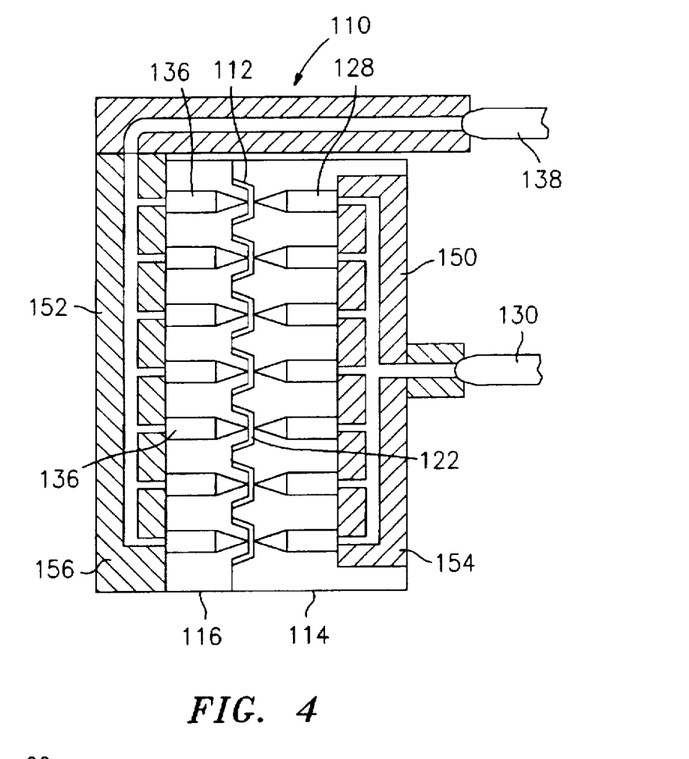
FIG. 4 is a cross-sectional view of the injection apparatus and method of the instant invention used in a multi-cavity mold.

Referring now to FIG. 4, the arrangement as shown in FIGS. 1–3 can be modified for use in a multi-cavity mold for the production of a multitude of composite material parts, typically small closures. Device 110 is used for forming a multitude of articles 112 in a single injection molding step. A device comprises a plurality of nozzles 136 positioned in male mold half 116 and a plurality of opposingly positioned nozzles 128 positioned in female mold half 114. Nozzles 128 are fed by injection unit 130 and nozzles 136 are fed by injection unit 138. Again, because of the lesser availability of horizontal space, injection unit 138 is positioned out of line with nozzles 136 as opposed to injection unit 130 being in line with nozzles 128. Injection unit 130 forcibly moves a first resin into nozzles 128 via a common feed area 150 having a plurality of feed branches leading to each nozzle. Similarly, injection unit 138 feeds a second resin into nozzles 136 via a common feed area 152 which has feed branches leading into nozzles 136. As a result of the opposing nozzles, the spacing between cavities 122 can be very tight so that a high number of closures can be produced within a given space available for molding. Hot runner manifolds 154 and 156 supporting nozzles 128 and 136, respectfully, are inherently isolated from each other, leading to precise temperature control and melt channel flow paths optimally configured for each resin type without interference from the requirements of other resins. Accordingly, manifolds 154 and 156 and nozzles 128 and 136 can be of the standard variety which are normally used for making articles requiring only a single material.

Figure 5:
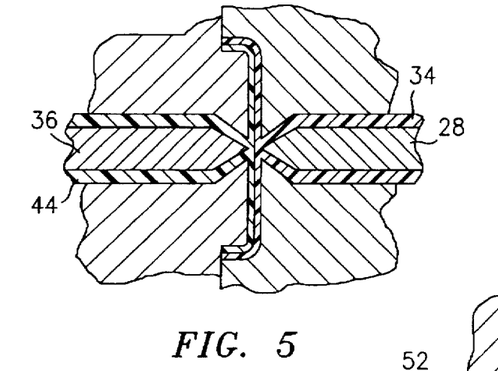
FIG. 5 is a cross-sectional view showing the results of simultaneous injection.

Various processes of resin injection can be used with the two embodiments shown in FIGS. 1–4. Referring to FIG. 5, if instead of using a sequential injection as discussed above in FIGS. 1–4, a simultaneous injection process is used, a two-layered instead of a three-layered article comprising two resin materials can be formed. FIG. 5 shows results of simultaneously injecting different resins 34 and 44 from nozzles 28 and 36, respectively. In addition to the simultaneous injection, the fine tuning of material volume and velocity from each of the nozzles can produce different outcomes in the characteristics of the molded article.

Figure 6:
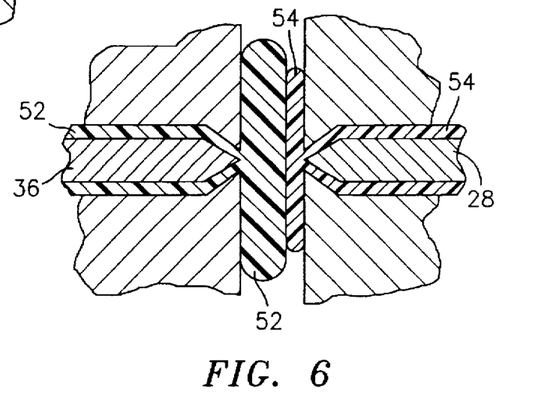
FIG. 6 is a cross-sectional view showing the results of using simultaneous injection and combining a high viscous and low viscous resin.

Referring now to FIG. 6, if materials having different viscosities are used, an even different result in article 12 can be achieved. FIG. 6 shows a high viscosity material 52 being ejected from nozzle 36 and a low viscosity material 54 being ejected from nozzle 28. As a result of the slower flow into cavity 22 by low viscosity material 54, the resultant article exhibits a thin wall and a thick wall, wherein the thin wall is comprised of the slower entering low viscosity material 54. In addition, parameters such as velocity, pressure and timing can be varied to mold articles having desired performance or visual characteristics which are dictated by the material thicknesses of the article.

Figure 7:
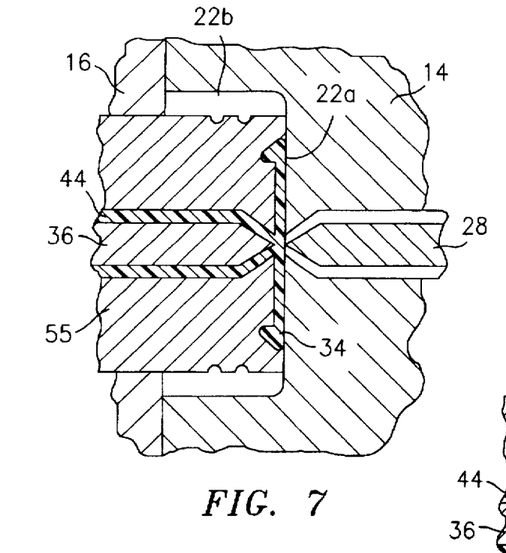
FIGS. 7 and 8 are cross-sectional views showing the injection apparatus being used with a movable core for forming a multi-layered article.
Figure 8:
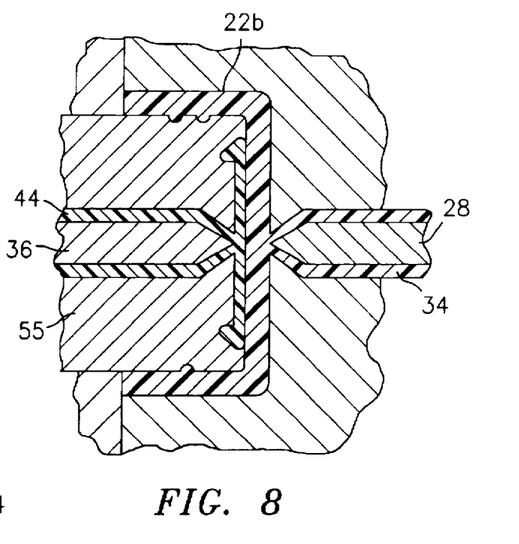

In addition to the above parameters, if mold cavity shapes are altered and mold half movements are performed, uniquely layered and configured articles can be achieved. Referring now to FIGS. 7 and 8, for example, male mold half 16 is shown having a mold core 55 having a grooved periphery and a recessed end for achieving a threaded closure upon cooperation with female mold half 14. As shown in FIG. 7, female mold half 14 is positioned such that it abuts the end of core 55, forming cavity 22a with the recessed end. At this juncture, a first material can be injected into cavity 22a, for filling the same with first material 44 from nozzle 36 in mold core 55, as shown in FIG. 7. Mold core 55 can then be drawn back, as shown in FIG. 8, for creating a larger mold cavity 22b for the introduction of material 34 from nozzle 28. Accordingly, article 12 is formed, as shown in FIG. 8, comprising two structurally distinct portions formed from two distinct materials.

Figure 9:
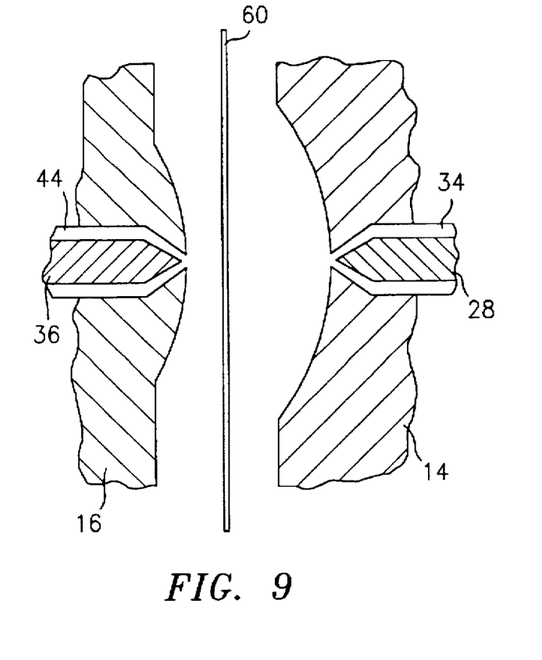
FIGS. 9 and 10 are cross sectional views showing the injection apparatus and a process of using a sheet material for imprinting or dividing the molded article.
Figure 10:
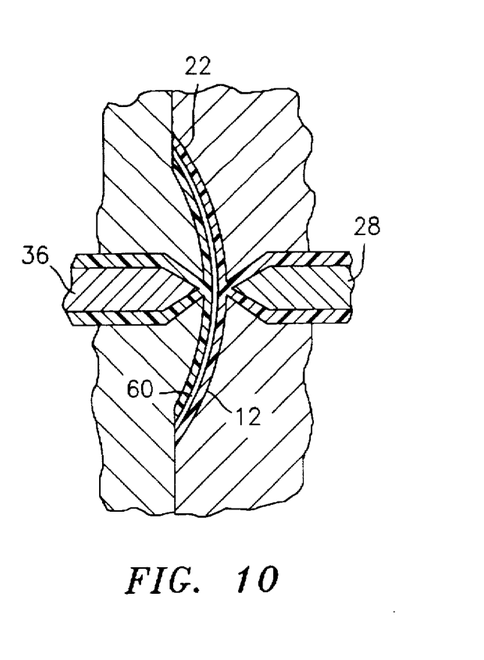

FIGS. 9 and 10 are indicative of another process which may be used with the nozzle arrangement shown in FIG. 1–4. In this process, a film or sheet 60 can be placed between female mold half 14 and male mold half 16 for use as reinforcement, as a means for decorating the molded article, or as an insert for separation and the formation of two articles in one cavity. Once the mold is closed, injection can begin from both halves of the mold, as shown in FIG. 10, either simultaneously or sequentially. As such, sheet 60 is covered by injected materials 34 on one side and 44 on the other side. The resultant article 12 has a material of different types on each side of it, and if sheet 60 is used as a partition for separation, mating elements of different materials are created.

Figure 11:
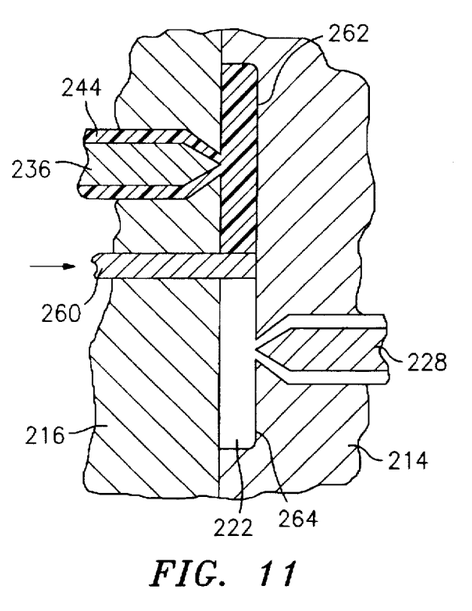
FIGS. 11 and 12 are cross-sectional views showing an alternative embodiment of this invention wherein the nozzles are offset from each other.
Figure 12:
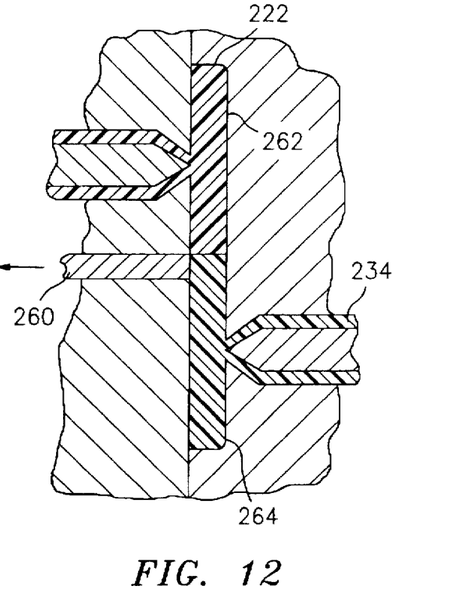

Another embodiment of the instant invention is shown in FIGS. 11 and 12, wherein an article can be formed having abutting halves of different materials. In this embodiment, nozzle 236 is positioned in mold half 216 vertically offset from the positioning of nozzle 228 in female mold half 214. A partition 260 is operable to be positioned in and retracted from cavity 222 so as to divide cavity 222. As such, and referring to FIG. 11, first material resin 244 is injected into first cavity portion 262 of cavity 222. Partition 260 is then retracted and second material, resin 234, as shown in FIG. 12, is injected into second cavity portion 264 of cavity 222. As an alternative to using partition 260, a metered shot of a first material, resin 244, could be injected into cavity 222, followed by a second injection of a resin 234 to fill out the space of cavity 222 and bond to first material, resin 244. Also, both materials 244 and 234 could be injected simultaneously which would result in reduced time required to fill cavity 222, as well as a more simplified non-metered injection process.

Figure 13:
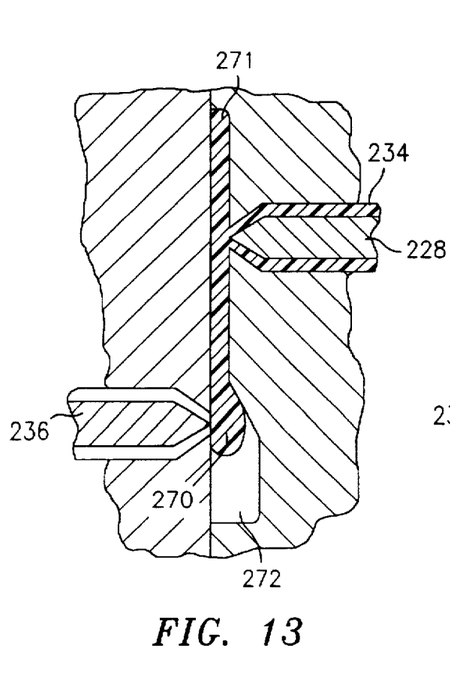
FIGS. 13 and 14 are cross-sectional views of the offset nozzle embodiment using a non-uniform mold.
Figure 14:
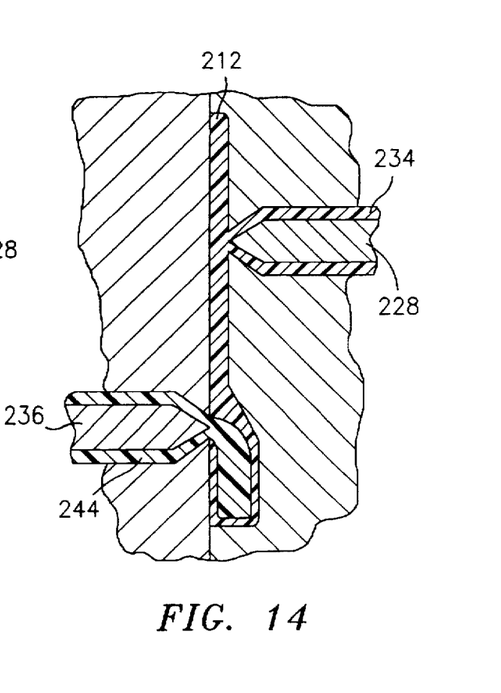

In using the offset arrangement as shown in FIGS. 11 and 12, other types of molded articles can be achieved by varying other parameters such as mold shape, timing, pressure, and viscosity (as discussed above). FIGS. 13 and 14 show an example of using the offset design of FIGS. 11 and 12 with a non-uniform shaped mold cavity 270. As shown in FIG. 13, mold cavity 270 is separated into an upper small portion 271 having a lesser volume than a lower large portion 272. A first material, resin 234, is injected to fill upper portion 271, and this is followed by the injection of a second material, resin 244 into lower portion 272, which fills cavity 270, as shown in FIG. 14. As a result of this process and mold configuration, the article 212 produced, in its lower portion, has a skin material of one characteristic and a core of another characteristic. Different combinations of injection points, amounts, and timing can be utilized to produce articles with various configurations.

Figure 15:
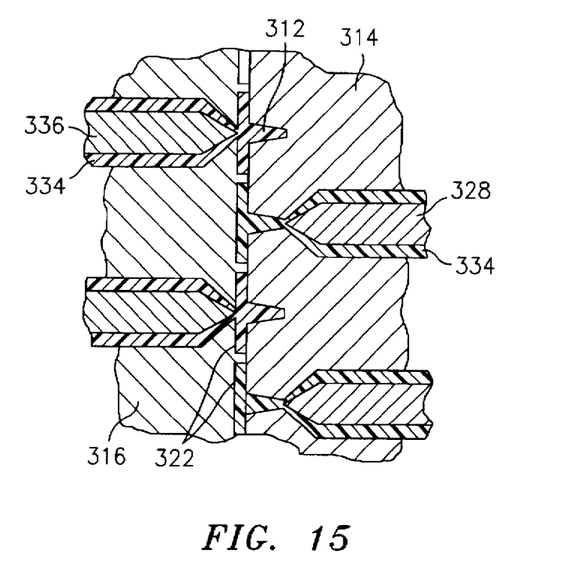
FIG. 15 is a cross sectional view showing another embodiment of the present invention using multiple offset nozzles.

Another alternative embodiment of this invention is shown in FIG. 15. In this instance, the offset layout of the nozzles as shown in FIGS. 11–14 can be used for the injection molding of a large number of small monomaterial articles 312 via a multitude of closely spaced cavities 322. With the arrangement as shown in FIG. 15, spacings as tight as the molded article size will allow can be achieved. As shown in FIG. 15, a plurality of cavities are injected from female mold half 314 via nozzles 328 and a plurality of cavities 312 are injected from male mold half 316 via nozzles 336. The offset nature of the plurality of sequentially spaced nozzles 328 and 336 enable the faces of the mold halves 314 and 316 to be efficiently used with nearly adjacent spacing of the mold cavities 322. This arrangement liberates the design of the hot runners and allows the use of standard nozzles and manifolds systems, without increasing the distance between mold cavities, thereby capitalizing on the area available for molding articles 312. This arrangement is particularly advantageous when a mechanically actuated injection gate is to be used for the cavities 322. For example, many medical articles require that the gate vestige be smoother than available with thermal gates, thus requiring mechanical gates. Such mechanically actuated gates generally require room in excess of room requirements for thermal gates. The offset arrangement of the plurality of nozzles in this embodiment creates more room, thereby satisfying the room requirement of the mechanical gates.

Figure 16:
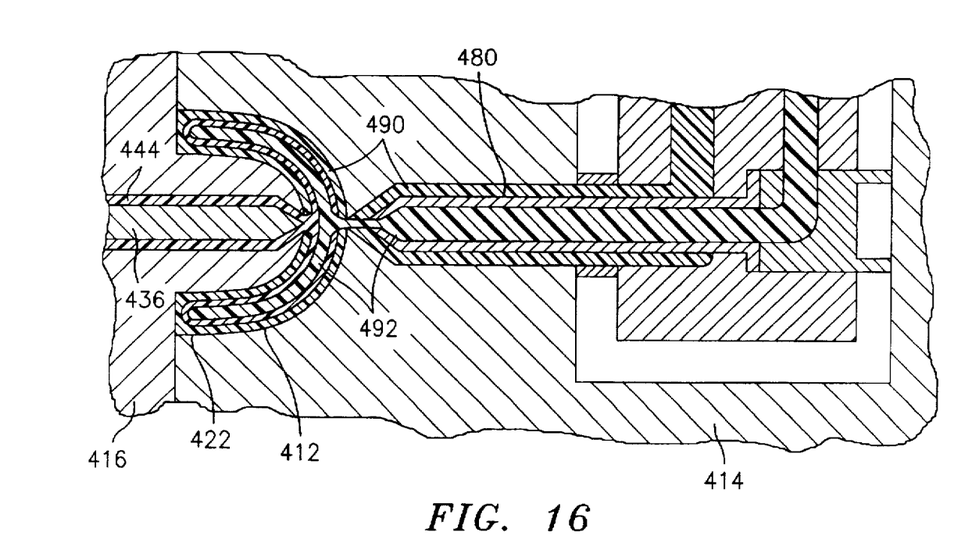
FIG. 16 is a cross-sectional view of another alternative embodiment showing the use of a singular nozzle positioned in one mold half and a co-injection nozzle positioned in the other mold half.

FIG. 16 is indicative of another embodiment of this invention, wherein a co-injection nozzle 480 is used in female mold half 414 and is opposed by singular material injection nozzle 436, similar to those shown in the other embodiments, in male mold half 416. As an additional alternative, a co-injection nozzle could also be employed in the mold half 416 for injecting two or more materials from male half 416. Any combination of one material, two material or more than two material nozzles could be used in the mold halves configuration as shown in FIG. 16, to satisfy the manufacturing of the type of articles desired. As a consequence of the nozzles opposing each other in opposing mold halves, simplication of the hot runner 454 of the co-injection nozzle 480 can be achieved. That is, portions of the previously complex hot runner systems, for example, the hot runners for the normal nozzle types, can be moved into the male mold half 416 thereby creating room in female mold half 414 for the more complex hot runners used with co-injection nozzles 480.

In one example of the operation of a system as shown in FIG. 16, a first amount of material 490 is injected from female mold halves 416 and co-injection nozzle 480 into mold cavity 422. First material 490 is followed by a second material 444 from nozzle 436 positioned in the male mold half 416. Sequentially, a third material 492 is injected into cavity 422 from co-injection nozzle 480 which divides and further pushes materials 490 and 444 into cavity space 422 for filling the same. This is only one example of the injection combinations which are possible using the principles of this embodiment of this invention. That is, injections can be sequential or simultaneous, the nozzles can be of any configuration, for example, opposed or offset, the injections can be independently and precisely metered, timed, or otherwise effected, and mold movements can take place between or during the injections.

The primary object of this invention is to provide a system and method for injecting a plurality of resins into a mold cavity in a space efficient manner. Another object is to provide an injection system and method which uses simple nozzle and hot runner designs. Yet another object is to provide an injection system and method wherein hot runners and nozzles can be independently adjusted for each resin while such system is space efficient. Still another object is to provide an injection system and method which is simple in construction and can produce parts with unique qualities. And still another advantage of this invention is that a space efficient single resin injection system is provided for efficiently molding a plurality of articles in a multi-cavity mold.

It is apparent that there has been provided in accordance with this invention a opposed gating injection system and process which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding system for forming a plastic molded article and for use with an injection molder having a first mold half and a second mold half adapted to cooperate with each other to form a plurality of mold cavities for forming a plurality of plastic molded articles, comprising:

at least one first injection means positioned in said first mold half adjacent at least one cavity of said plurality of cavities for injecting a first plastic molding material into said at least one cavity through a first orifice; and at least one second injection means positioned in said second mold half adjacent another cavity of said plurality of cavities for injecting said first plastic material into said another cavity through a second orifice wherein each cavity has only one orifice.

2. The system according to claim 1, wherein said at least one first injection means and said at least one second injection means are substantially offset from each other.

3. The system according to claim 2, further comprising a plurality of sets of said at least one injection means adjacent said at least one cavity substantially offset from said at least one second injection means adjacent said another cavity, said sets positioned in said mold halves.

4. The system according to claim 1, wherein said first mold half is a female mold half and said second mold half is a male mold half.

5. The system according to claim 1, including a plurality of closely spaced mold cavities.

6. The system according to claim 5, wherein said first and second injection means are offset from each other.

7. The system according to claim 1, wherein said cavities have a non-uniform cross section.

\* \* \* \* \*

UNITED STATES PATENT AND TRADEMARK OFFICE
CERTIFICATE OF CORRECTION

PATENT NO. : 5,789,033
DATED      : August 4, 1998
INVENTOR(S): Rene A. Bertschi et al.

It is certified that error appears in the above-indentified patent and that said Letters Patent is hereby corrected as shown below:

On the Cover Page, the inventors should read:

(1) Rene A. Bertschi
    (2) Martin Osterode
    (3) Walter Malmquist
    (4) Edward J. Jenko Signed and Sealed this Seventeenth Day of November, 1998

*Attest:*

BRUCE LEHMAN

*Attesting Officer*   *Commissioner of Patents and Trademarks*